(12) United States Patent
Song et al.

(10) Patent No.: US 10,606,065 B2
(45) Date of Patent: Mar. 31, 2020

(54) EYEPIECE

(71) Applicant: Zhejiang Sunny Optics Co., Ltd., Ningbo (CN)

(72) Inventors: Litong Song, Ningbo (CN); Fujian Dai, Ningbo (CN); Yinfang Jin, Ningbo (CN)

(73) Assignee: ZHEJIANG SUNNY OPTICS CO., LTD., Ningo (CN)

( * ) Notice: Subject to any disclaimer, the term of this patent is extended or adjusted under 35 U.S.C. 154(b) by 18 days.

(21) Appl. No.: 15/578,708

(22) PCT Filed: Nov. 11, 2016

(86) PCT No.: PCT/CN2016/105407
§ 371 (c)(1),
(2) Date: Nov. 30, 2017

(87) PCT Pub. No.: WO2018/068356
PCT Pub. Date: Apr. 19, 2018

(65) Prior Publication Data
US 2018/0299660 A1 Oct. 18, 2018

(30) Foreign Application Priority Data
Oct. 14, 2016 (CN) .......................... 2016 1 0898436

(51) Int. Cl.
*G02B 3/08* (2006.01)
*G02B 25/00* (2006.01)
(Continued)

(52) U.S. Cl.
CPC ............. *G02B 25/001* (2013.01); *G02B 3/04* (2013.01); *G02B 3/08* (2013.01); *G02B 25/04* (2013.01);
(Continued)

(58) Field of Classification Search
CPC .......... G02B 3/04; G02B 3/08; G02B 5/1876; G02B 25/001; G02B 25/04; G02B 27/0018; G02B 27/0172; G02B 2027/012
(Continued)

(56) References Cited

U.S. PATENT DOCUMENTS 5,619,373 A * 4/1997 Meyerhofer ....... G02B 27/0037
359/482
2008/0269890 A1* 10/2008 Simpson ............... A61F 2/1613
623/6.46
(Continued)

FOREIGN PATENT DOCUMENTS

| CN | 1196496 A | 10/1998 |
|----|-----------|---------|
| CN | 101978304 A | 2/2011 |

(Continued)

*Primary Examiner* — Travis S Fissel
(74) *Attorney, Agent, or Firm* — Sughrue Mion, PLLC

(57) ABSTRACT

The present invention provides an eyepiece. The eyepiece is composed of one lens, which comprises a first surface and a second surface that are opposite, wherein, the first surface is a curved surface, and the second surface is a Fresnel structure surface; the Fresnel structure surface is formed by a plurality of annular zones that are sequentially arranged, to form a sawtooth surface, and each of the annular zones is formed by a working surface and a non-working surface, the working surface is an aspheric surface, and the non-working surface is a straight bevel; and the eyepiece satisfies the following conditional expression: $85°<FOV<130°$, and $0°≤θi≤5°$; wherein, FOV is a maximum angle of view of the eyepiece, and $θi$ is the angle between the non-working surface of the ith annular zone and the optical axis.

8 Claims, 10 Drawing Sheets

(51) Int. Cl.
*G02B 27/01* (2006.01)
*G02B 25/04* (2006.01)
*G02B 3/04* (2006.01)
*G02B 27/00* (2006.01)

(52) U.S. Cl.
CPC ..... *G02B 27/0018* (2013.01); *G02B 27/0172* (2013.01); *G02B 2027/012* (2013.01)

(58) Field of Classification Search
USPC ............. 359/457, 742, 647; 351/159.12
See application file for complete search history.

(56) References Cited

U.S. PATENT DOCUMENTS

| | | | |
|---|---|---|---|
| 2012/0268816 A1* | 10/2012 | Bae | G02B 3/08 359/463 |
| 2013/0050640 A1* | 2/2013 | Fiala | G02C 7/041 351/159.43 |
| 2015/0226887 A1* | 8/2015 | Gombert | G02B 3/08 359/742 |
| 2015/0286068 A1* | 10/2015 | Chene | G02B 3/08 702/155 |
| 2015/0301317 A1* | 10/2015 | Watanabe | G02B 13/14 359/356 |

FOREIGN PATENT DOCUMENTS

| | | |
|---|---|---|
| CN | 104823079 A | 8/2015 |
| CN | 104898283 A | 9/2015 |
| CN | 106019567 A | 10/2016 |
| CN | 106291940 A | 1/2017 |
| CN | 205958837 U | 2/2017 |
| JP | H10228245 A | 8/1998 |
| JP | 2004347823 A | 12/2004 |

* cited by examiner

EYEPIECE

CROSS-REFERENCE TO RELEVANT APPLICATIONS

The present patent application claims the right of priority of the Chinese patent application No. 201610898436.6, which was filed on Oct. 14, 2016, which was incorporated herein in its entirety by reference.

TECHNICAL FIELD

The present invention relates to an eyepiece, and particularly to an eyepiece that is used in head-mounted displays.

BACKGROUND ART

In recent years, virtual reality and augmented reality techniques have entered the stage of high speed development, and the head-mounted displays that are applied to them also become hot spot products of the field of displaying in recent years. Head-mounted displays are required to have compact structures and small weight to be convenient for head wearing. Additionally, the angle of view is required to be as large as possible, to increase the observation range. Furthermore, the image quality should be emphatically considered, by controlling types of aberrations of optical imaging systems. Therefore, eyepiece optical systems are the core of head-mounted displays.

The patent with the patent number "CN104823079A" provides a Fresnel lens and an optical device. The refraction type Fresnel lens can reduce the noise that is created by the reflection and/or refraction of light on the sidewall, to improve the imaging quality. However, the wide angle characteristic of the refraction type Fresnel lens can still be further optimized, to satisfy the demand of the market, especially the higher requirements on optical imaging systems by head mounted displays.

SUMMARY OF THE INVENTION

Considering that, an object of the present invention is to provide an eyepiece that is adapted for head-mounted displays and has a large field of view and high image quality, and obtain a large relative eye distance.

The eyepiece of the present invention is composed of one lens, which comprises a first surface and a second surface that are opposite, wherein, the first surface is a curved surface, and the second surface is a Fresnel structure surface; the Fresnel structure surface is formed by a plurality of annular zones that are sequentially arranged, to form a sawtooth surface, and each of the annular zones is formed by a working surface and a non-working surface; and the eyepiece satisfies the following conditional expression: 85°<FOV<130°; wherein, FOV is a maximum angle of view of the eyepiece. The first surface, by employing the curved surface, can improve the resolution capability of the lens, so that the image quality is clearer. Additionally, the employing of the Fresnel structure surface can enable the images that can be observed by human eyes to be greater than the sensitive vision area, to obtain good immersion sense.

Further, in the eyepiece of the present invention, on the Fresnel structure surface of the second surface of the eyepiece, it is defined that in the ith annular zone that is counted from a near optical axis towards an edge, the working surface is an aspheric surface; the non-working surface is a straight bevel, and an angle between the non-working surface and an optical axis is defined as $\theta_i$, and satisfies the conditional expression: $0° \leq \theta_i \leq 5°$. The employing of the aspheric surface for the working surface improves the design freedom, and further facilitates enlarging the angle of view. Additionally, the employing of the straight bevel for the non-working surface can enable the lens to have good workability, reduce parasitic light, and improve the performance of the lens.

Further, in the eyepiece of the present invention, a plurality of annular zones in the Fresnel structure surface of the second surface of the eyepiece are arranged on a basal surface, and the basal surface is a flat surface. The employing of the flat surface for the basal surface facilitates reducing the thickness of the lens, and satisfies the requirements on lighting and thinning.

Further, in the eyepiece of the present invention, a plurality of annular zones in the Fresnel structure surface of the second surface of the eyepiece are arranged on a basal surface, and the basal surface is a curved surface. The employing of the curved surface for the basal surface facilitates the image quality of the peripheral field of view, and improves the overall definition of the images.

Further, in the eyepiece of the present invention, on the Fresnel structure surface of the second surface of the eyepiece, it is defined that the width of the ith annular zone that is counted from the near optical axis towards the edge, that is, the spacing of the ith annular zone perpendicular to the direction of the optical axis, is $z_i$, and satisfies $0.08$ mm $\leq z_i \leq 3.5$ mm; and it is defined that a depth of the ith annular zone is $d_i$, and satisfies $0$ mm $< d_i \leq 0.5$ mm. Such a design can effectively reduce the impact on the imaging quality by parasitic light while ensuring the comfort when human eyes are watching image crystal lattices.

Further, the eyepiece of the present invention satisfies the relational expression: $0 \leq SAG1/DY \leq 0.2$; wherein, SAG1 is an axis distance between an intersection point of the first surface and an optical axis and a vertex of an effective radius of the first surface; and DY is an effective external diameter of the eyepiece. Such a design can obtain a large angle of view, and enables the images that can be observed by human eyes to be greater than the sensitive vision area, to obtain good immersion sense.

Further, the eyepiece of the present invention satisfies the relational expression: 7 mm $\leq$ ED $\leq$ 20 mm; wherein, ED is an axis distance between a pupil of a human eye and the first surface when the eyepiece is working. The using in that working distance range can ensure good overall uniformity of the image quality.

Further, the eyepiece of the present invention satisfies the relational expression: 25 mm $\leq$ EFL $\leq$ 50 mm; wherein, EFL is an effective focal length of the eyepiece.

Further, the eyepiece of the present invention satisfies the relational expression: $0.02 < CT/DY < 0.4$; wherein, CT is a center thickness of the eyepiece; and DY is an effective external diameter of the eyepiece. The satisfying of the conditional expression can realize good immersion sense and small crystal lattices taste.

Further, the first surface of the eyepiece of the present invention is provided thereon with periodic diffractive phases that are formed by a plurality of periodic phase annular zones, a descending step is provided between the neighboring periodic phase annular zones from a near optical axis towards an edge, depths of the descending steps are equal and it is defined that the depth of the steps is t, and satisfies the following conditional expression: 0.0005 mm<t≤0.0025 mm. Such a design can effectively rectify the systematic chromatism, to further improve the imaging quality of the eyepiece.

Advantageous Effects

The advantageous effects of the present invention are that, the miniature eyepiece of the present invention employs the one-piece lens, whose one surface employs the curved surface and other surface employs the Fresnel lens structure, and has a large angle of view, which effectively rectifies aberration, improves the imaging quality, and obtains a large relative eye distance.

DETAILED DESCRIPTION OF THE INVENTION

Figure 1:
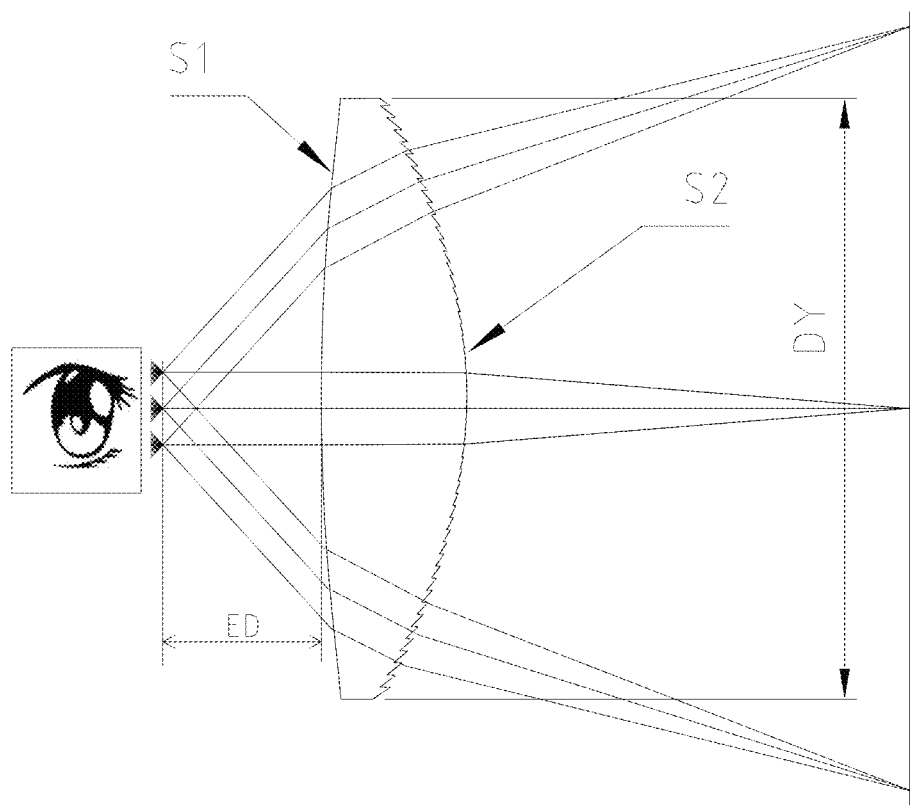
FIG. 1 is the schematic diagram of the operating principle of the eyepiece of the present invention.

The eyepiece of the present invention will be further illustrated in detail below by referring to the drawings and the embodiments of the present invention.

The First Embodiment

Figure 2:
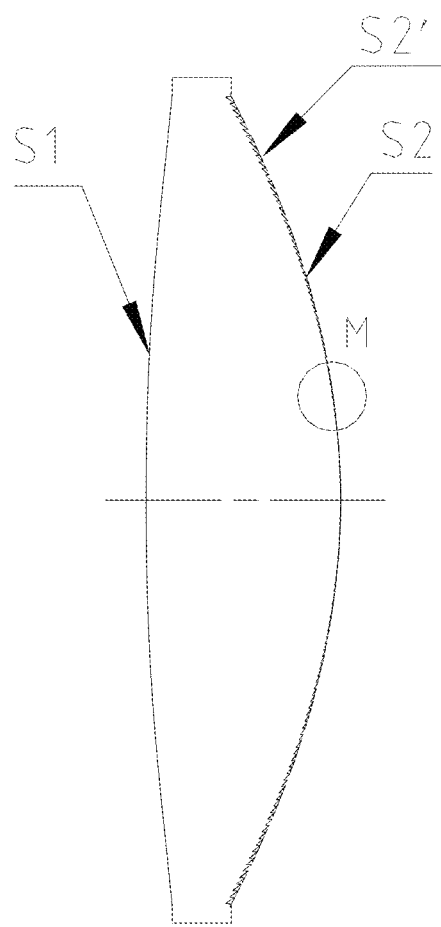
FIG. 2 is the structural schematic diagram of the eyepiece of the first embodiment.
Figure 3:
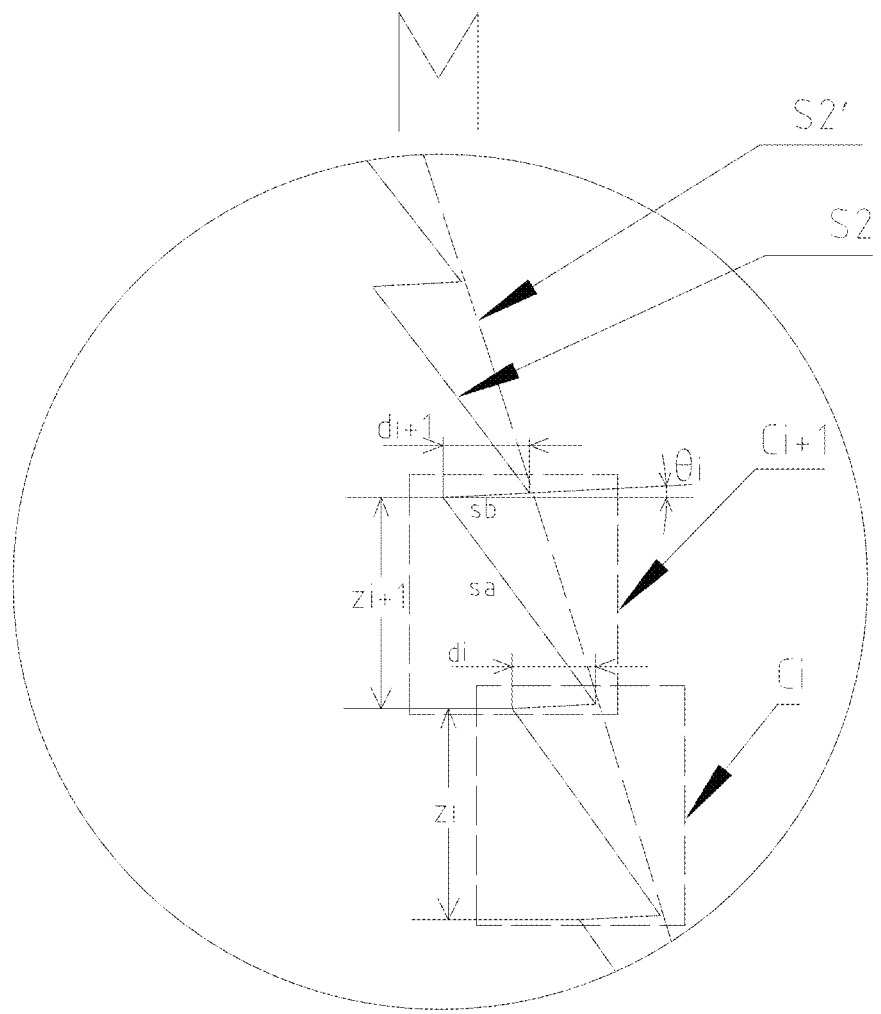
FIG. 3 is the schematic diagram of the Fresnel structure surface in the eyepiece of the present invention.

Referring to FIGS. 2 and 3, the eyepiece is composed of one lens L1, which comprises a first surface S1 and a second surface S2 that are opposite, wherein the first surface S1 is an aspheric surface, and the second surface S2 is a Fresnel structure surface.

The second surface S2 of the eyepiece is a Fresnel structure surface, and is formed by a plurality of annular zones that are sequentially arranged, to form a sawtooth surface. It is defined that the width of the ith annular zone that is counted from the near optical axis towards the edge, that is, the spacing of the ith annular zone perpendicular to the direction of the optical axis, is zi, and all of the annular zone widths of the annular zones are equal, and satisfy: $z_i$=0.4 mm. Each of the annular zones Ci is formed by a working surface Sa and a non-working surface Sb. The working surface Sa satisfies the conditional expression:

$$x = \frac{ch^2}{1+\sqrt{1-(k+1)c^2h^2}} + \Sigma\, A_i h^i,$$

wherein, h is the height from any one point on the working surface Sa to the optical axis, c is the vertex curvature, k is the conic constant, and Ai is the ith order correction factor of the aspheric surface.

In the annular zones, the non-working surface Sb is a straight bevel, which has an angle θi with the optical axis, and satisfies the conditional expression: 2°<θi<5°. The annular zones in the Fresnel structure surface of the second surface S2 of the eyepiece are arranged on a basal surface S2', and the basal surface S2' is a curved surface. It is defined that the depth of the ith annular zone that is counted from a near optical axis towards an edge is di, and satisfies 0.1 mm<di≤0.5 mm.

The axis distance between the pupil of the human eye and the first surface S1 when the eyepiece is working is ED, and it satisfies the following conditional expression: ED=13 mm.

The effective focal length of the eyepiece is EFL, and it satisfies the following conditional expression: EFL=37.68 mm.

The center thickness of the eyepiece is CT, and the effective external diameter of the eyepiece is DY, wherein they satisfy the following conditional expression: CT/DY=0.24.

The maximum angle of view of the eyepiece is FOV, and it satisfies the following conditional expression: FOV=95.04°.

The condition parameters of the first embodiment are as shown in the following Table 1:

TABLE 1

| FOV (°) | 95.04 | SAG1/DY | 0.03 |
| θi (°) | 2~5 | ED (mm) | 13 |
| zi (mm) | 0.4 | EFL (mm) | 37.68 |
| di (mm) | 0.1~0.5 | CT/DY | 0.24 |

The Second Embodiment

Figure 4:
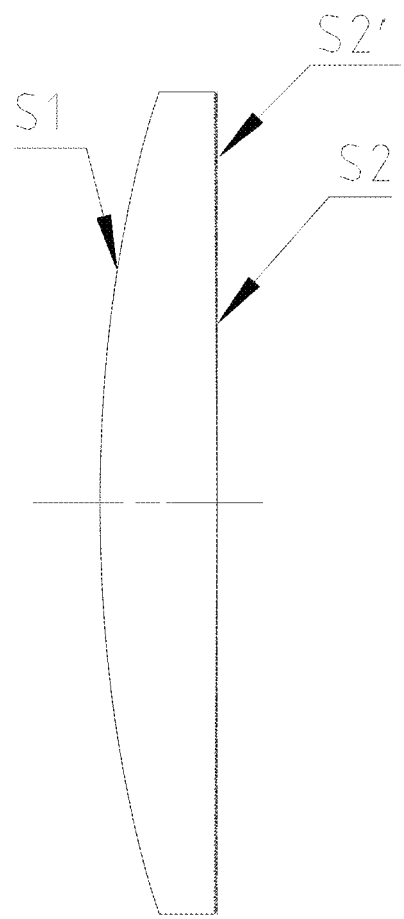
FIG. 4 is the structural schematic diagram of the eyepiece of the second embodiment.

Referring to FIGS. 4 and 3, the eyepiece is composed of one lens L1, which comprises a first surface S1 and a second surface S2 that are opposite, wherein the first surface S1 is an aspheric surface, and the second surface S2 is a Fresnel structure surface.

The second surface S2 of the eyepiece is a Fresnel structure surface, and is formed by a plurality of annular zones that are sequentially arranged, to form a sawtooth surface. It is defined that the width of the ith annular zone that is counted from the near optical axis towards the edge, that is, the spacing of the ith annular zone perpendicular to the direction of the optical axis, is zi, and all of the annular zone widths of the annular zones are equal, and satisfy: $z_i$=0.2 mm. Each of the annular zones Ci is formed by a working surface Sa and a non-working surface Sb. The working surface Sa satisfies the conditional expression:

$$x = \frac{ch^2}{1+\sqrt{1-(k+1)c^2h^2}} + \Sigma\, A_i h^i,$$

wherein, h is the height from any one point on the working surface Sa to the optical axis, c is the vertex curvature, k is the conic constant, and Ai is the ith order correction factor of the aspheric surface. In the annular zones, the non-working surface Sb is a straight bevel, which has an angle θi with the optical axis, and satisfies the conditional expression: 1°<θi<3°. The annular zones in the Fresnel structure surface of the second surface S2 of the eyepiece are arranged on a basal surface S2', and the basal surface S2' is a flat surface. It is defined that the depth of the ith annular zone that is counted from a near optical axis towards an edge is di, and satisfies 0.0 mm<di≤0.3 mm.

The condition parameters of the second embodiment are as shown in the following Table 2, and the definitions are all the same as those of the first embodiment, and will not be described further here.

TABLE 2

| FOV (°) | 95.04 | SAG1/DY | 0.07 |
|---|---|---|---|
| θi (°) | 1~3 | ED (mm) | 13 |
| zi (mm) | 0.2 | EFL (mm) | 39.67 |
| di (mm) | 0~0.3 | CT/DY | 0.14 |

The Third Embodiment

Figure 5:
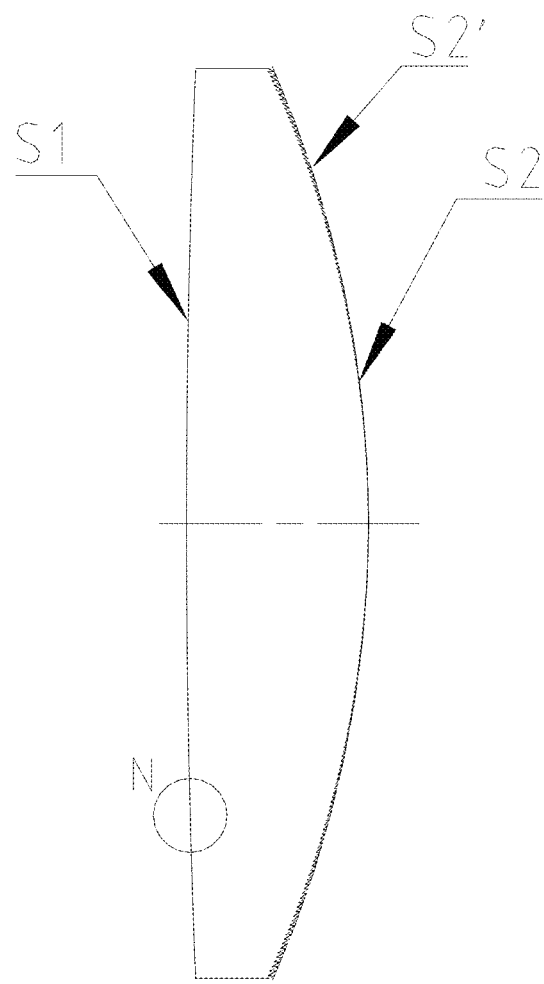
FIG. 5 is the structural schematic diagram of the eyepiece of the third embodiment.
Figure 6:
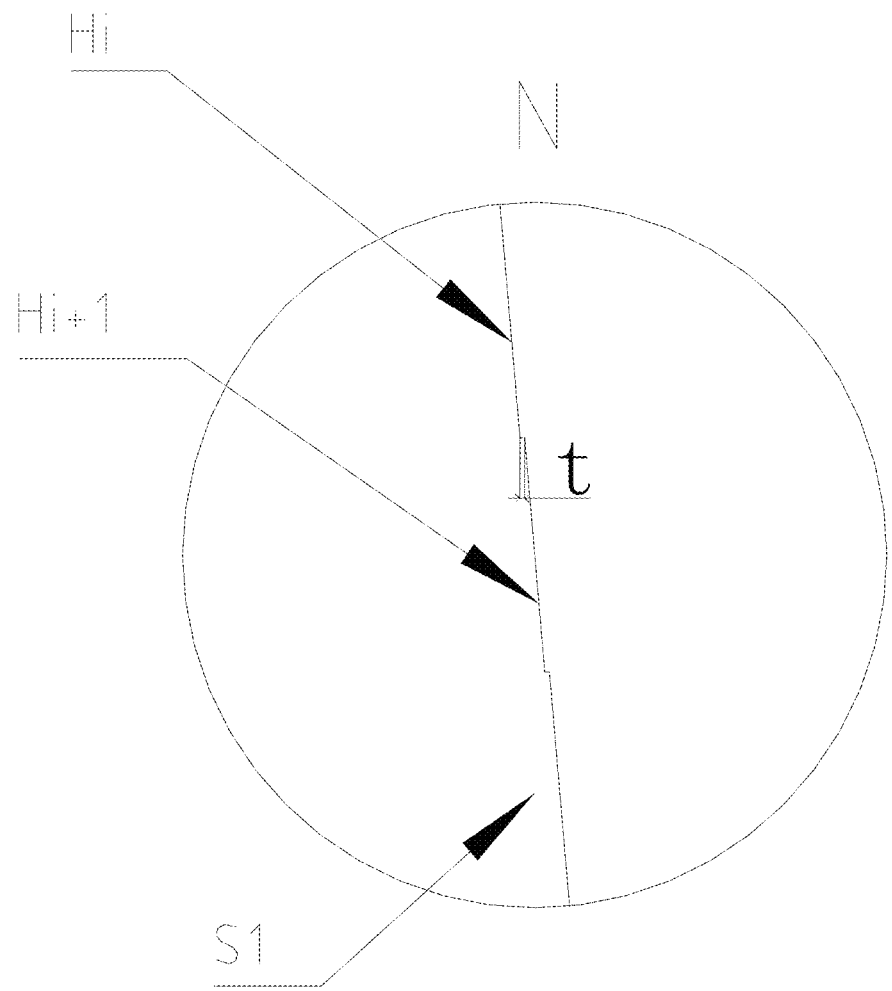
FIG. 6 is the structural schematic diagram of the phase wave zone of the eyepiece of the third embodiment.

Referring to FIGS. 3, 5 and 6, the eyepiece is composed of one lens L1, which comprises a first surface S1 and a second surface S2 that are opposite, wherein the first surface S1 is an aspheric surface, and the second surface S2 is a Fresnel structure surface.

In the present embodiment, the first surface of the eyepiece is provided thereon with periodic diffractive phases that are formed by a plurality of periodic phase annular zones, it is defined that a descending step is provided between the ith periodic phase annular zone Hi and the (i+1)th periodic phase annular zone Hi+1, depths of the descending steps are equal and it is defined that the depth of the steps is t, and satisfies ti=0.001 mm.

The second surface S2 of the eyepiece is a Fresnel structure surface, and is formed by a plurality of annular zones that are sequentially arranged, to form a sawtooth surface. It is defined that the width of the ith annular zone that is counted from the near optical axis towards the edge, that is, the spacing of the ith annular zone perpendicular to the direction of the optical axis, is zi, and all of the annular zone widths of the annular zones are equal, and satisfy: zi=0.25 mm. Each of the annular zones Ci is formed by a working surface Sa and a non-working surface Sb. The working surface Sa satisfies the conditional expression:

$$x = \frac{ch^2}{1 + \sqrt{1-(k+1)c^2h^2}} + \Sigma\, A_i h^i,$$

wherein, h is the height from any one point on the working surface Sa to the optical axis, c is the vertex curvature, k is the conic constant, and Ai is the ith order correction factor of the aspheric surface.

In the annular zones, the non-working surface Sb is a straight bevel, which has an angle θi with the optical axis, and satisfies the conditional expression: 0°<θi<2°. The annular zones in the Fresnel structure surface of the second surface S2 of the eyepiece are arranged on a basal surface S2', and the basal surface S2' is a curved surface. It is defined that the depth of the ith annular zone that is counted from a near optical axis towards an edge is di, and satisfies 0.0 mm<di≤0.3 mm.

The condition parameters of the third embodiment are as shown in the following Table 3:

TABLE 3

| FOV (°) | 98.8 | ED (mm) | 10 |
|---|---|---|---|
| θi (°) | 0~2 | EFL (mm) | 36.86 |
| zi (mm) | 0.25 | CT/DY | 0.2 |
| di (mm) | 0~0.3 | t (μm) | 1 |
| SAG1/DY | 0.01 | | |

The Fourth Embodiment

Figure 7:
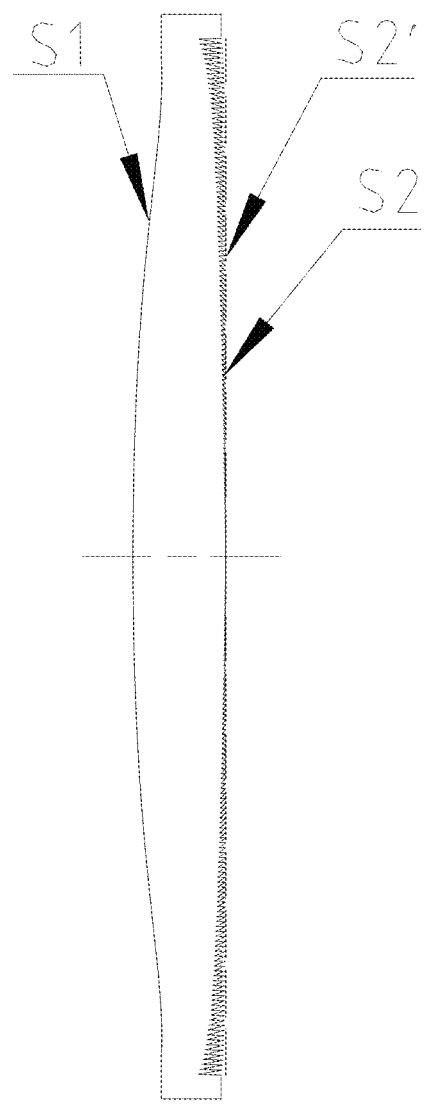
FIG. 7 is the structural schematic diagram of the eyepiece of the fourth embodiment.

Referring to FIGS. 7 and 3, the eyepiece is composed of one lens L1, which comprises a first surface S1 and a second surface S2 that are opposite, wherein the first surface S1 is an aspheric surface, and the second surface S2 is a Fresnel structure surface.

The second surface S2 of the eyepiece is a Fresnel structure surface, and is formed by a plurality of annular zones that are sequentially arranged, to form a sawtooth surface. It is defined that the width of the ith annular zone that is counted from the near optical axis towards the edge, that is, the spacing of the ith annular zone perpendicular to the direction of the optical axis, is zi, and all of the annular zone widths of the annular zones are equal, and satisfy: zi=0.25 mm. Each of the annular zones Ci is formed by a working surface Sa and a non-working surface Sb. The working surface Sa satisfies the conditional expression:

$$x = \frac{ch^2}{1 + \sqrt{1-(k+1)c^2h^2}} + \Sigma\, A_i h^i,$$

wherein, h is the height from any one point on the working surface Sa to the optical axis, c is the vertex curvature, k is the conic constant, and Ai is the ith order correction factor of the aspheric surface. In the annular zones, the non-working surface Sb is a straight bevel, which has an angle θi with the optical axis, and satisfies the conditional expression: 1°<θi<3°. The annular zones in the Fresnel structure surface of the second surface S2 of the eyepiece are arranged on a basal surface S2', and the basal surface S2' is a flat surface. It is defined that the depth of the ith annular zone that is counted from a near optical axis towards an edge is di, and satisfies 0.0 mm<di≤0.3 mm.

The condition parameters of the fourth embodiment are as shown in the following Table 4:

TABLE 4

| FOV (°) | 125.76 | SAG1/DY | 0.03 |
|---|---|---|---|
| θi (°) | 1~3 | ED (mm) | 10.29 |
| zi (mm) | 0.25 | EFL (mm) | 25 |
| di (mm) | 0~0.3 | CT/DY | 0.05 |

The Fifth Embodiment

Figure 8:
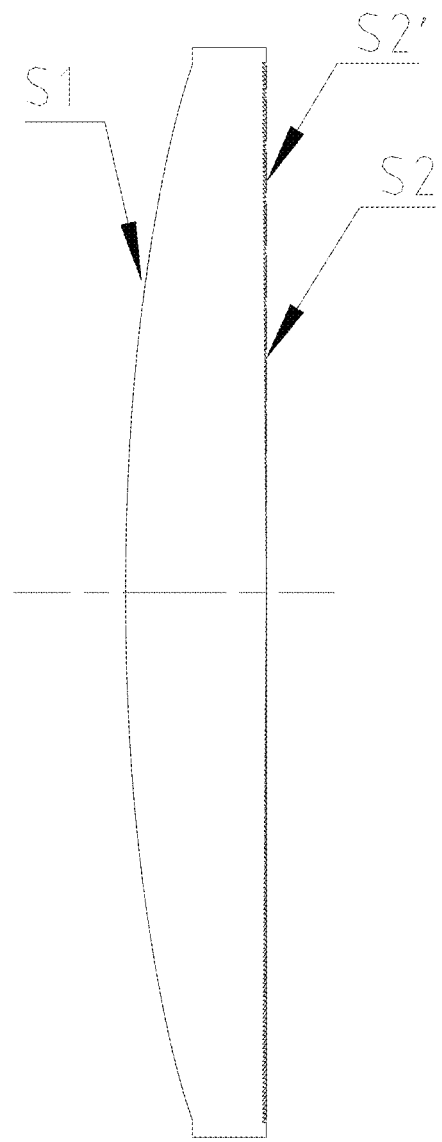
FIG. 8 is the structural schematic diagram of the eyepiece of the fifth embodiment.

Referring to FIGS. 8 and 3, the eyepiece is composed of one lens L1, which comprises a first surface S1 and a second surface S2 that are opposite, wherein the first surface S1 is an aspheric surface, and the second surface S2 is a Fresnel structure surface.

The second surface S2 of the eyepiece is a Fresnel structure surface, and is formed by a plurality of annular zones that are sequentially arranged, to form a sawtooth surface. It is defined that the width of the ith annular zone that is counted from the near optical axis towards the edge, that is, the spacing of the ith annular zone perpendicular to the direction of the optical axis, is zi, and all of the annular zone widths of the annular zones are equal, and satisfy: zi=0.25 mm. Each of the annular zones Ci is formed by a working surface Sa and a non-working surface Sb. The working surface Sa satisfies the conditional expression:

$$x = \frac{ch^2}{1 + \sqrt{1-(k+1)c^2h^2}} + \Sigma\, A_i h^i,$$

wherein, h is the height from any one point on the working surface Sa to the optical axis, c is the vertex curvature, k is the conic constant, and Ai is the ith order correction factor of the aspheric surface. In the annular zones, the non-working surface Sb is a straight bevel, which has an angle θi with the optical axis, and satisfies the conditional expression: 1°<θi<3°. The annular zones in the Fresnel structure surface of the second surface S2 of the eyepiece are arranged on a basal surface S2', and the basal surface S2' is a flat surface. It is defined that the depth of the ith annular zone that is counted from a near optical axis towards an edge is di, and satisfies 0.0 mm<di≤0.3 mm.

The condition parameters of the fifth embodiment are as shown in the following Table 5:

TABLE 5

| FOV (°) | 89.98 | SAG1/DY | 0.04 |
| θi (°) | 1~3 | ED (mm) | 10.29 |
| zi (mm) | 0.25 | EFL (mm) | 50 |
| di (mm) | 0~0.3 | CT/DY | 0.13 |

The Sixth Embodiment

Figure 9:
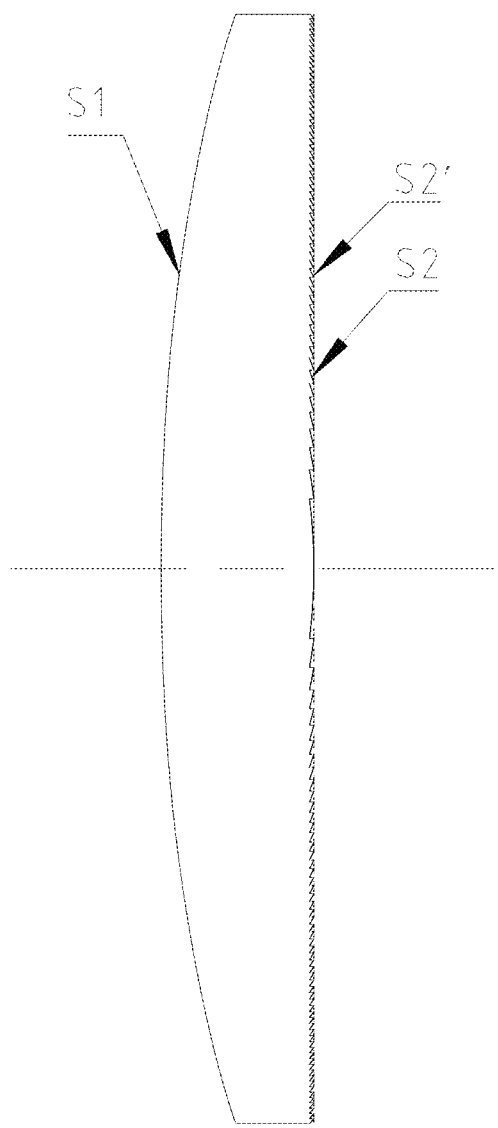
FIG. 9 is the structural schematic diagram of the eyepiece of the sixth embodiment.
Figure 10:
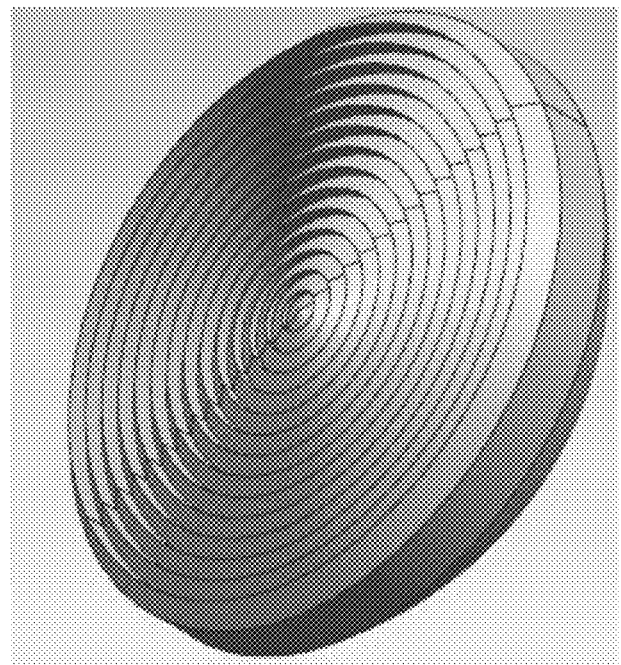
FIG. 10 is the schematic diagram of the three-dimensional structure of the eyepiece of the present invention.
Figure 11:
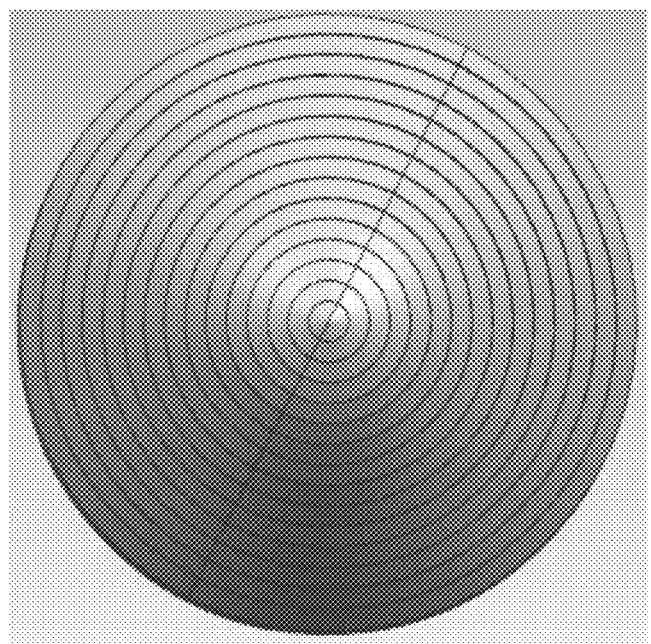
FIG. 11 is the front three-dimensional schematic diagram of the eyepiece of the present invention.

Referring to FIGS. 9 and 3, the eyepiece is composed of one lens L1, which comprises a first surface S1 and a second surface S2 that are opposite, wherein the first surface S1 is an aspheric surface, and the second surface S2 is a Fresnel structure surface.

The second surface S2 of the eyepiece is a Fresnel structure surface, and is formed by a plurality of annular zones that are sequentially arranged, to form a sawtooth surface. It is defined that the width of the ith annular zone that is counted from the near optical axis towards the edge, that is, the spacing of the ith annular zone perpendicular to the direction of the optical axis, is zi, and satisfies: 0.2 mm≤zi≤3.1 mm. Each of the annular zones Ci is formed by a working surface Sa and a non-working surface Sb. The working surface Sa satisfies the conditional expression:

$$x = \frac{ch^2}{1 + \sqrt{1-(k+1)c^2h^2}} + \Sigma\, A_i h^i,$$

wherein, h is the height from any one point on the working surface Sa to the optical axis, c is the vertex curvature, k is the conic constant, and Ai is the ith order correction factor of the aspheric surface. In the annular zones, the non-working surface Sb is a straight bevel, which has an angle θi with the optical axis, and satisfies the conditional expression: θi=0°. The annular zones in the Fresnel structure surface of the second surface S2 of the eyepiece are arranged on a basal surface S2', and the basal surface S2' is a flat surface. It is defined that the depth of the ith annular zone that is counted from a near optical axis towards an edge is di, wherein the depths of each two neighboring annular zones are all equal, and satisfy di=0.2 mm.

The condition parameters of the sixth embodiment are as shown in the following Table 6:

TABLE 6

| FOV (°) | 88 | SAG1/DY | 0.07 |
| θi (°) | 0 | ED (mm) | 15 |
| zi (mm) | 0.2~3.1 | EFL (mm) | 42.5 |
| di (mm) | 0.2 | CT/DY | 0.14 |

The above embodiments are merely preferable particular embodiments that are presented to sufficiently illustrate the eyepiece of the present invention, and are not limiting the protection scope of the present invention. The equivalent substitutions or alternations that are made by a person skilled in the art on the basis of the present invention all fall within the protection scope of the present invention. The protection scope of the present invention is limited by the contents that are set forth by the claims.

What is claimed is:

1. An eyepiece, composed of one lens, having a first surface and a second surface that are opposite, wherein, the first surface is a curved surface, and the second surface is a Fresnel structure surface; the Fresnel structure surface is a sawtooth surface formed by a plurality of annular zones that are sequentially arranged, and each of the annular zones is formed by a working surface and a non-working surface; and wherein the eyepiece satisfies 85°<FOV<130°, where FOV is a maximum angle of view of the eyepiece;

wherein, on the second surface, a width zi of the i-th annular zone that is counted from a near optical axis of the second surface towards an edge of the second surface satisfies 0.08 mm≤zi≤3.5 mm; and a depth di of the i-th annular zone satisfies 0 mm<di≤0.5 mm; and wherein, the first surface is provided thereon with a plurality of periodic phase annular zones, a descending step is provided between any two neighboring periodic phase annular zones located from a near optical axis of the first surface towards an edge of the first surface, each descending step has a depth t equal to that of other descending step, and the depth t of the descending step satisfies 0.0005 mm<t<0.0025 mm, wherein the depth of the descending step is a distance measured parallel to an optical axis of the eyepiece.

2. The eyepiece according to claim 1, wherein: in the second surface, the working surface of the i-th annular zone is an aspheric surface, and the non-working surface of the i-th annular zone is a straight bevel, wherein an angle θi between the non-working surface of the i-th annular zone and the optical axis satisfies: 0°<θi<5°.

3. The eyepiece according to claim 1, wherein: the plurality of annular zones in the Fresnel structure surface of the second surface of the eyepiece are arranged on a basal surface, and the basal surface is a flat surface.

4. The eyepiece according to claim 1, wherein: the plurality of annular zones in the Fresnel structure surface of the second surface of the eyepiece are arranged on a basal surface, and the basal surface is a curved surface.

5. The eyepiece according to claim 1, wherein, the eyepiece satisfies: 0<SAG1/DY<0.2 where, SAG1 is an axis distance between an intersection point of the first surface and the optical axis and a vertex of an effective radius of the first surface; and DY is an effective external diameter of the eyepiece.

6. The eyepiece according to claim 1, wherein, the eyepiece satisfies: 7 mm≤ED≤20 mm where, ED is an axis distance between a pupil of a human eye and the first surface when the eyepiece is working.

7. The eyepiece according to claim 1, wherein, the eyepiece satisfies: 25 mm≤EFL≤50 mm where, EFL is an effective focal length of the eyepiece.

8. The eyepiece according to claim 1, wherein, the eyepiece satisfies: 0.02<CT/DY<0.4 where, CT is a center thickness of the eyepiece, and DY is an effective external diameter of the eyepiece.

* * * * *